Dec. 11, 1962  L. W. SCHWARTZ  3,068,029
STRUCTURAL ASSEMBLY
Filed Dec. 21, 1959  3 Sheets-Sheet 1
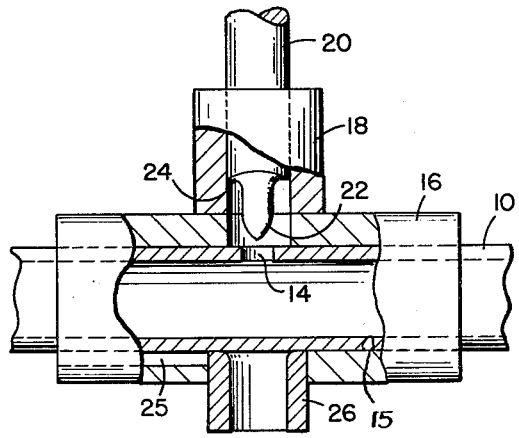
FIG. 1
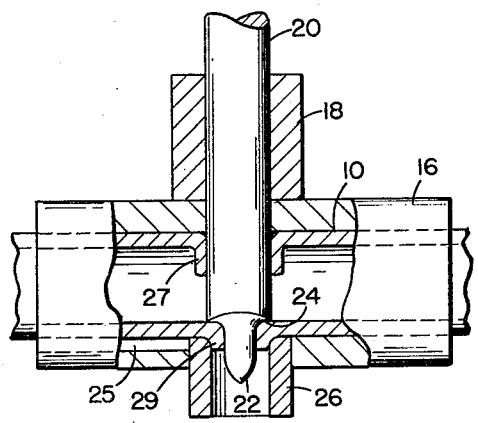
FIG. 2
FIG. 3
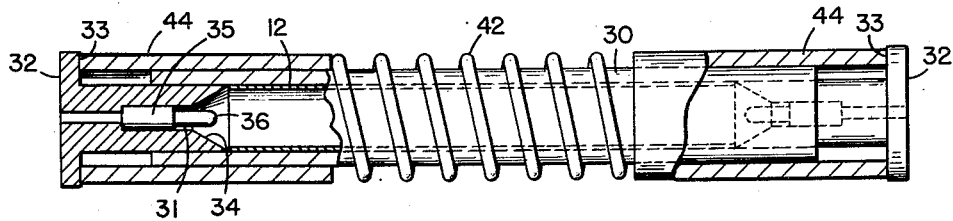
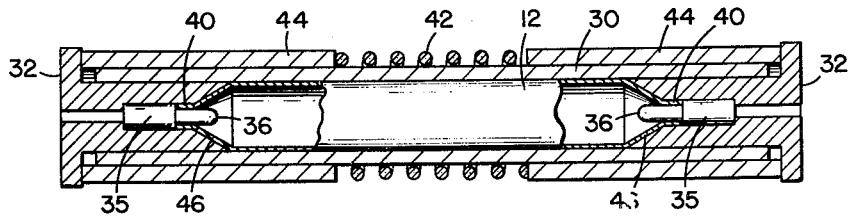
FIG. 4
INVENTOR.
LEONARD W. SCHWARTZ
BY
Attorney Dec. 11, 1962   L. W. SCHWARTZ   3,068,029
STRUCTURAL ASSEMBLY
Filed Dec. 21, 1959   3 Sheets-Sheet 2

INVENTOR.
LEONARD W. SCHWARTZ
BY *Bishlringer*
Attorney

INVENTOR.
LEONARD W. SCHWARTZ

United States Patent Office 3,068,029
Patented Dec. 11, 1962

3,068,029
STRUCTURAL ASSEMBLY
Leonard W. Schwartz, Pittsford, N.Y., assignor to Schwartz Metal Company, Inc., Pittsford, N.Y., a corporation of New York
Filed Dec. 21, 1959, Ser. No. 860,841
4 Claims. (Cl. 287—54)

The present invention relates to a structural assembly, and the method of making the same, and more particularly to an assembly of tubular members, and to a method of forming the same.

Heretofore, in fastening one tube directly to another, a T fitting, for example, was used or the end of one tube was attached to the wall of the other tube by welding, or by using nuts and bolts, or rivets, or the like. In some instances, the end of one tube was flanged, with the flange being bolted or otherwise attached to the wall of the other tube. Another type of joint was made by securing a plate having a central threaded opening in the end of one tube, forming an opening in the wall of the other tube of sufficient diameter to receive the end of the first tube, and inserting a screw through the wall of the second tube and into the plate of the first tube to secure the two tubes together.

One of the objects of the present invention is to provide an improved joint for fastening a pair of tubes directly to one another.

Another object of this invention is to provide an improved joint of the character described which does not require bolting, welding, soldering, or other external means for holding the tubes together.

Another object of the invention is to provide a method of forming a pair of tubes so that they may be joined directly to one another in angularly disposed relationship.

Other objects of this invention will become apparent from the specification, the drawings, and the appended claims.

Figure 8:
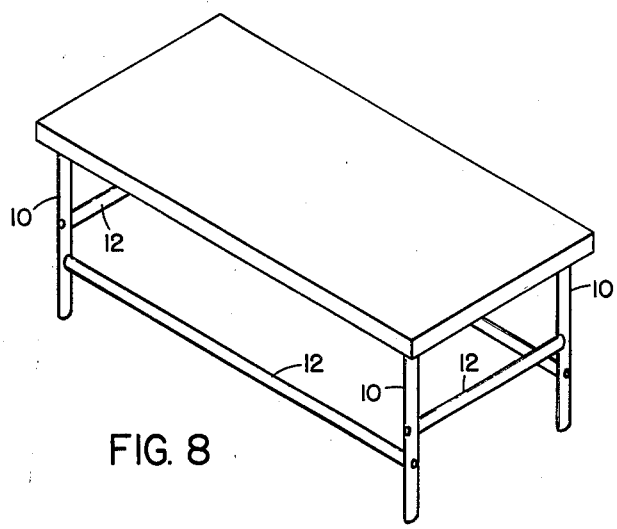
Figure 5:
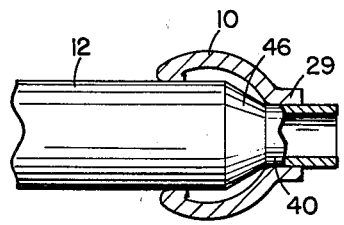
Figure 6:
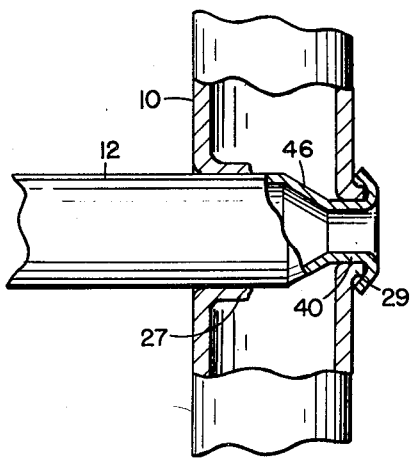
Figure 7:
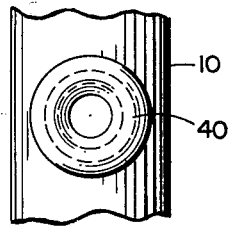
Figure 9:
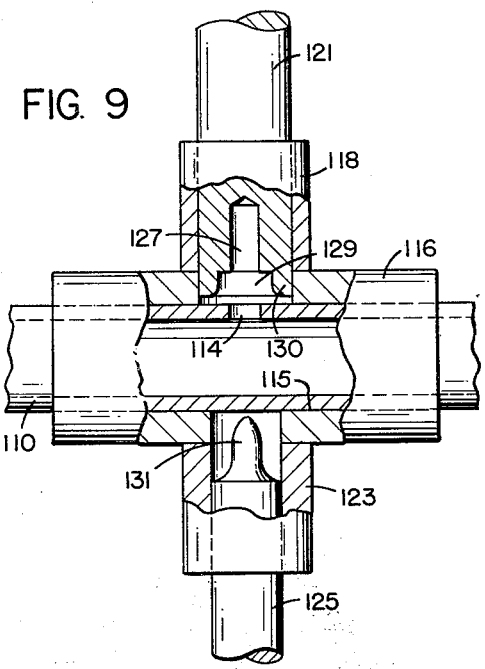
Figure 10:
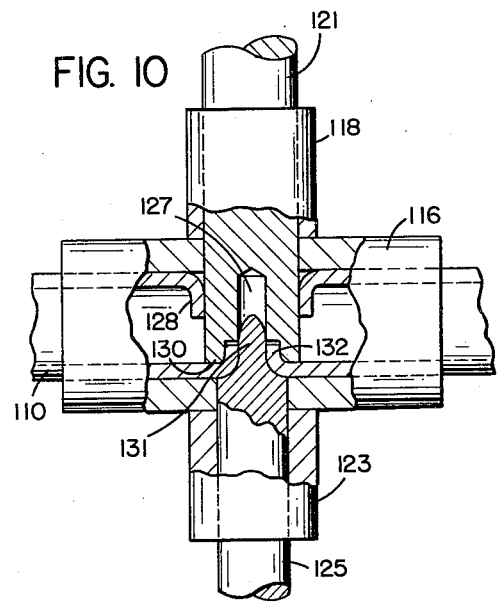
Figure 11:
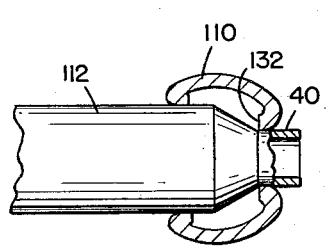
Figure 12:
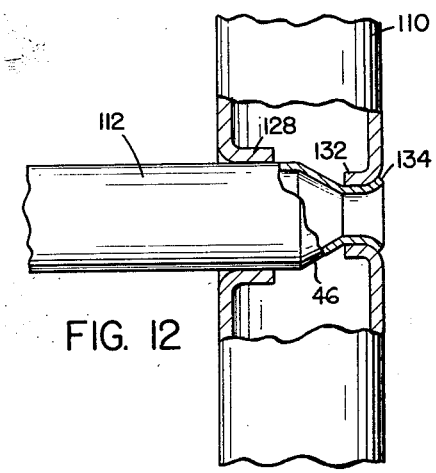
Figure 13:
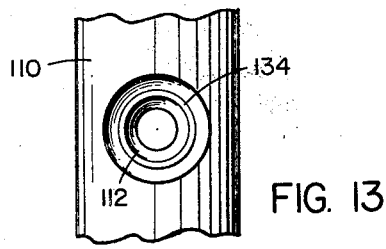

In the drawings:
FIG. 1 illustrates a tube positioned in a punching tool holder preparatory to punching said tube to form one part of a joint according to one embodiment of the invention, said tube and tool holder being shown partly in cross section;
FIG. 2 is a view similar to that of FIG. 1 but with the punching tool at the end of its punching stroke;
FIG. 3 is a view partly in elevation and partly in section of another tube positioned between tools preparatory to shaping its ends in order that it may be joined to the first tube;
FIG. 4 is a view, partly in elevation and partly in section, showing the relative positions of the tube and the tools of FIG. 3 after the ends of the tube have been formed;
FIG. 5 is a view partly in elevation and partly in section showing one end of the last-mentioned tube inserted in the first tube as a first step in forming a joint according to one embodiment of this invention;
FIG. 6 is a fragmentary elevation partly broken away to show the completed joint;
FIG. 7 is a side elevation of the completed joint;
FIG. 8 is a view in perspective of a table, the legs and cross-braces of which are joined together according to this invention;
FIG. 9 illustrates a tube positioned in a modified form of punching tool holder preparatory to punching said tube to form one part of a joint according to another embodiment of this invention;
FIG. 10 is a view similar to FIG. 9 with the punching tool at the end of the punching stroke;
FIG. 11 is a view partly in elevation and partly in section showing one end of a tube, which is formed by the tools of FIGS. 3 and 4, inserted in a tube, which is formed by the tools of FIGS. 9 and 10, as a first step in forming a joint according to this second embodiment of this invention;
FIG. 12 is a fragmentary elevation partly broken away to show the completed tubular joint made according to this second embodiment of this invention; and
FIG. 13 is a side elevation of the completed joint looking from the right of FIG. 12.

In the illustrated embodiments of this invention, one tube is formed with a reduced diameter at one end which is connected by a frusto-conical portion with the main body of the tube. The other tube has an opening of large diameter in one side sufficient to receive the main body of the first tube and a diametrally opposite opening of smaller diameter which is sufficient to receive the smaller diameter portion of the first tube. In the first illustrated embodiment of this invention the outer end of the smaller diametral portion of the first tube extends through the diametrally opposite opening in the wall of the second tube and is peened over the edge of an outwardly-extending collar around this smaller opening to secure the two tubes together. In the second illustrated embodiment of the invention, the second tube has an inwardly-extending collar around its smaller opening, and the smaller diametral portion of the first tube is inserted in the smaller opening and is flared outwardly at its end to be substantially flush with the outside surface of the second tube to secure the two tubes together.

Referring to the drawings by numerals of reference and first to the embodiment of the invention shown in FIGS. 1 through 7, 10 denotes a tube in which the female portion of the joint is formed, and 12 denotes a tube on which the male portion of the joint is formed. Tube 12 is of smaller outside diameter than tube 10.

In forming the tube 10 (FIGS. 1 and 2), a small hole 14 is initially drilled or otherwise formed in the wall of the tube, and the tube 10 is then inserted in the bore 15 of a punch holder 16. The holder 16 has a guide portion 18 rigid with it, which has a bore that extends at right angles to the bore 15. A punching tool 20 reciprocates in the guide portion 18. The shank of the tool 20 is of a diameter approximately equal to the outside diameter of the tube 12. The tool 20 has a punch bit 22 integral with it which is of smaller diameter than the shank of the tool. The holder 16 has an opening in its wall diametrally opposite the guide portion 18. A bushing 26 fits removably in this opening. The inside diameter of this bushing 26 is larger than the diameter of the bit 22 of the punching tool. The holder 16 has an axial slot 25 in its wall which extends radially of the opening in which the bushing 26 removably fits. This slot 25 is slightly wider than the inside diameter of the bushing 26 and extends to one end of the holder 16.

The tube 10 is placed in the holder 16 with its opening 14 aligned with the punch bit 22. The bushing 26 is then inserted in the holder, as shown in FIGS. 1 and 2, until it engages the wall of the tube 10. The punch 20 is then forced by a ram (not shown), or other conventional means, through the opening 14 and through the diametrally opposite portion of the tube 10 so that the shank of the punch 20 is driven through the opening 14 and the bit 22 is driven through the diametrally opposite side of the tube. The punching stroke stops when the shoulder 24 of the punch engages this diametrally opposite side of the tube 10. The movement of the shank of the tool through the wall of the tube surrounding the opening 14 forms an inwardly-extending collar 27 around the punched hole and provides a hole through this collar which is of sufficient diameter to receive the tube 12. The punching of the opposite wall of the tube 10 by the bit 22 forces the stock of the tube into the bushing 26 and forms an outwardly-extending collar 29 having a smaller hole therethrough.

The punching tool 20 is withdrawn from the tube 10 upon completion of the punching stroke and the bushing 26 is removed from the holder 16. The tube 10 may then be removed from the holder 16 by pushing it out the left hand end of the holder as viewed in FIGS. 1 and 2 so that the collar 29 slides out through the slot 25.

To form the ends of the tube 12 so that it may be connected to the tube 10, the tube 12 (FIGS. 3 and 4) is inserted in a cylinder 30 (FIG. 3). Dies 32 are then fitted in opposite ends of this cylinder. Slidably mounted on the cylinder 30 at opposite ends thereof are sleeves 44 which are constantly urged apart by a coil spring 42 which surrounds the cylinder 30. Each die 32 has a flange 33 which engages the outer end of one of the sleeves 44.

Each die 32 has a central bore 31 that communicates at its inner end with a frustro-conical countersink portion 34. Mounted in each bore 31 is pin 35 having a portion 36 of reduced diameter at its inner end which extends into the frustro-conical portion 34 of the die. The reduced diameter portion of each pin 35 is spaced from the surrounding wall of the bore 31 a distance slightly greater than the thickness of the wall of the tube 12.

To form the ends of the tube 12, the dies 32 are pressed inwardly against the pressure of the spring 42 by a ram (not shown) or other conventional means. This causes the ends of the tube 12 to be forced into the frustro-conical portions 34 and into the portions of the bores 31 of the dies which surround the reduced diameter portions of the pins 36. Thus, the tube 12 is formed with frustro-conical portions 46 (FIG. 4) adjacent its opposite ends and with cylindrical portions 40 at its opposite ends which are of reduced diameter. When the dies 32 are released, the spring 42 expands, thus causing the sleeves 44 to strip the dies 32 out of the ends of the tube 12.

To assemble the two tubes 10 and 12 to one another after they have been shaped as above described, one end of the tube 12 is inserted through the collar 27 in the tube 10 until the portion 40 of the tube 12 (FIG. 5) extends outwardly through the smaller opening of the tube 10. The protruding end of the portion 40 is then swedged or peened over the collar 29 of the tube 10 (FIG. 6). Thus, the tube 12 is securely joined to the tube 10 perpendicular to the tube 10.

The peening of the portion 40 draws the tube 12 inwardly so that its frustro-conical portion 46 will prevent the tube 12 from shifting in one direction; and the peened over portion prevents the tube from shifting in the other direction. The inwardly-extending collar 27 and the outwardly-extending collar 29 provide supporting surfaces for the tube 12 and give added strength to the tube 10 around the two holes.

In the embodiment illustrated in FIGS. 9 through 13, a tube 110, in which the female portion of a joint is formed, is connected to the tube 112, on which the male portion of the joint is formed.

In forming the tube 110 (FIGS. 9 and 10), a small hole 114 is initially drilled or otherwise formed in the wall of the tube. The tube 110 is then inserted in the bore 115 of a punch and die holder 116 which has a guide portion 118 rigid with it in which a die 121 can reciprocate. Another guide portion 123 is disposed at the diametrally opposite side of the holder 118, rigid with the holder 116. A punch 125 is mounted to reciprocate in the guide portion 123. The die 121, which is of a diameter approximately equal to the outside diameter of the tube 112, has an axial recess 127 and a counterbore 129 in its operating end. The tool 125 has a punch bit 131 which is of slightly smaller diameter than the recess 127 and a shank portion which is of slightly larger diameter than the counterbore 129.

After the tube 110 is placed in the cylinder 116 with its opening 114 aligned with the recess 127, the die 121 is driven by a ram (not shown), or other conventional means, through the wall of the tube 110 while the punch bit 131 is being driven through the diametrally opposite side of the tube wall. The stroke of the die 121 stops when the outer face 130 of the die engages the opposite side of the tube 110. The shank of the die 121 forms an inwardly-extending collar 128 on the tube 110 around the punched hole 114, which has a bore therethrough that is of sufficient diameter to receive a tube 112.

In the punching operation the punch bit 131 is driven into the recess 127 of the die 121. This forms an inwardly-extending collar 132. The hole through this collar is of sufficient diameter to receive the smaller diametral portion 40 of the tube 112.

When the punching tools 121 and 125 have been withdrawn from the tube 110 the tube may be removed from the holder 116 by merely pushing it out either end thereof.

The ends of the tube 112 may be shaped as are the ends of the tube 12 in the first-described embodiment of the invention.

In joining a tube 112 to a tube 110, the reduced diameter end portion of the tube 112 is inserted through the openings in the tube 110 until the portion 40 of the tube 112 extends into the collar 132 of the tube 110. Then the end of the tube 112 is rolled or flared outwardly, as at 134 (FIG. 12) against the collar 132 so that its end is substantially flush with the surface of the tube 110. This prevents the tube 112 from shifting axially in one direction; and the tube is held against shifting axially in the opposite direction by its frustro-conical portions 46. As in the first-described embodiment of the inwardly-extending collar 128 and in inwardly-extending collar 132 provide supporting surfaces for the tube 12 and give added strength to the tube 110 around its holes.

Thus, I have provided an improved joint which does not require soldering, welding, brazing, riveting, or bolting to secure two tubes together. Moreover, I have provided an improved joint which is simple to make and which will not become loose even under extreme conditions.

While the invention has been described in connection with two specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A structural assembly, comprising a generally-cylindrical first tube having a portion of relatively large diameter and a portion of reduced diameter and a frustro-conical portion connecting said two portions, a second generally-cylindrical tube having two axially aligned circular holes through diametrally opposite sides, one of said holes being of larger diameter than the other, said one hole being of approximately the same diameter as said large diameter portion of said first tube to receive said large diameter portion, and the other hole being of approximately the same diameter as said reduced diameter portion of said first tube to receive said reduced diameter portion, said first tube being inserted, transverse to said second tube, through the larger hole in the second tube with said reduced diameter portion of said first tube extending into the smaller hole in the second tube and with the small end of said frustro-conical portion engaging the inner edge of said smaller hole, and said reduced diameter portion of said first tube engaging the outside of said second tube around said smaller hole.

2. A method of joining two generally cylindrical tubes, one of which is of smaller diameter than the other, comprising drawing down said one tube at one end to have a portion of further reduced diameter at said one end connected by a frusto-conical portion to the larger diametral portion of said one tube, punching in a single operation a large circular hole through one side of the other tube of a diameter approximately equal to the larger diametral portion of said one tube and a small circular hole in the other side of said other tube which is diametrally opposite said first hole and which is approximately equal in diameter to the diameter of the reduced end portion of said one tube, inserting said one tube through the hole in said other tube until its reduced diametral portion extends outwardly beyond said small hole, and then deforming the outwardly-extending end of said reduced diametral portion to engage against the outside of said other tube around said small hole and to draw said frusto-conical portion into a position against the inside of said other tube around said small hole.

3. A method of forming one member of a structural assembly, which comprises supporting a generally cylindrical tube around its periphery, and driving a die which has an axial recess of small circular diameter and a communicating counterbore of larger circular diameter at its operating end, through a tube so that said die forms a first hole through one side of said tube having an inwardly-extending collar around its peripheral edge, while simultaneously driving a punch through the opposite side of said tube diametrally opposite said die and in a direction opposite to the die and into said recess to form a second hole in said tube diametrally opposite said first hole and so that said punch deforms said tube in said counterbore to form an inwardly-extending collar around the inside of said second hole, and stopping said die against said opposite side of said tube.

4. A method of joining two tubes together comprising the steps of driving a first punching tool which has a cylindrical operating portion of large diameter and which has at its operating end an axial recess and a counterbore communicating therewith, through one side of one tube to form in said one side a large diameter circular hole having an inwardly extending collar around said hole, while simultaneously driving a second punch of smaller diameter through the diametrally opposite side of said one tube in a direction opposite to said first punch and into the recess of said first tool to form a smaller circular hole in said opposite side of said one tube and to form an inwardly-extending collar around said smaller hole, and drawing a second generally cylindrical tube, which is of approximately the same outside diameter as said larger diameter punch, down at one end to form a reduced diameter portion having a diameter equal to approximately the diameter of said smaller hole and a frusto-conical portion connecting said reduced diameter portion with the larger diameter portion of said second tube, and then axially inserting said second tube through the larger hole in said one tube until the reduced diametral portion of said second tube extends into said smaller hole, and then swedging said reduced diametral portion to engage against said inwardly-extending collar and to draw said frusto-conical portion against said inwardly directed collar to secure the two tubes together.

References Cited in the file of this patent

UNITED STATES PATENTS

| | | |
|---|---|---|
| 1,432,072 | Lowy | Oct. 17, 1922 |
| 2,005,205 | Rix | June 18, 1935 |
| 2,337,742 | Dittmar | Dec. 28, 1943 |
| 2,550,070 | La Brecque et al. | Apr. 24, 1951 |
| 2,835,513 | Pearson | May 20, 1958 |
| 2,846,249 | Johnson | Aug. 5, 1958 |
| 2,911,029 | Huet | Nov. 3, 1959 |

FOREIGN PATENTS

| | | |
|---|---|---|
| 686,299 | Germany | Jan. 6, 1940 |